Feb. 26, 1952 P. WILLIAMS 2,587,564
AUTOMATIC DISTRESS SIGNALING DEVICE
Filed June 7, 1947 2 SHEETS—SHEET 1

INVENTOR.
PAUL WILLIAMS
BY Victor J. Evans & Co.
ATTORNEYS

Feb. 26, 1952 P. WILLIAMS 2,587,564
AUTOMATIC DISTRESS SIGNALING DEVICE
Filed June 7, 1947 2 SHEETS—SHEET 2
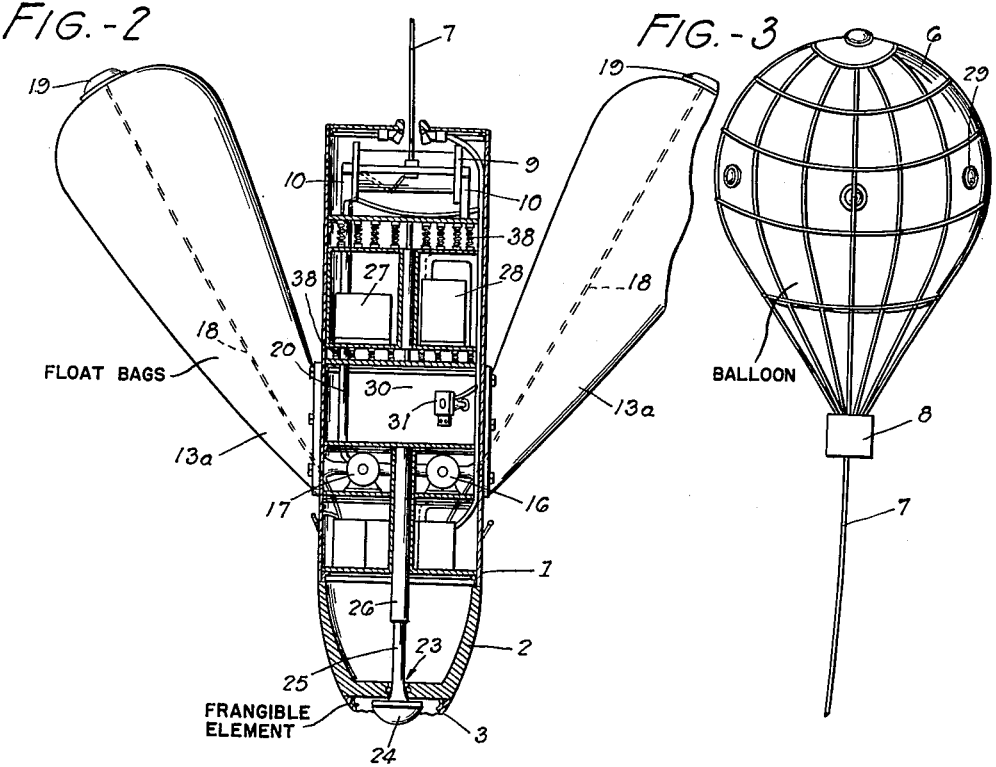
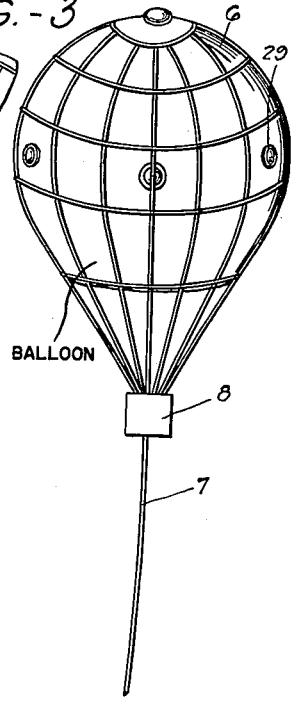
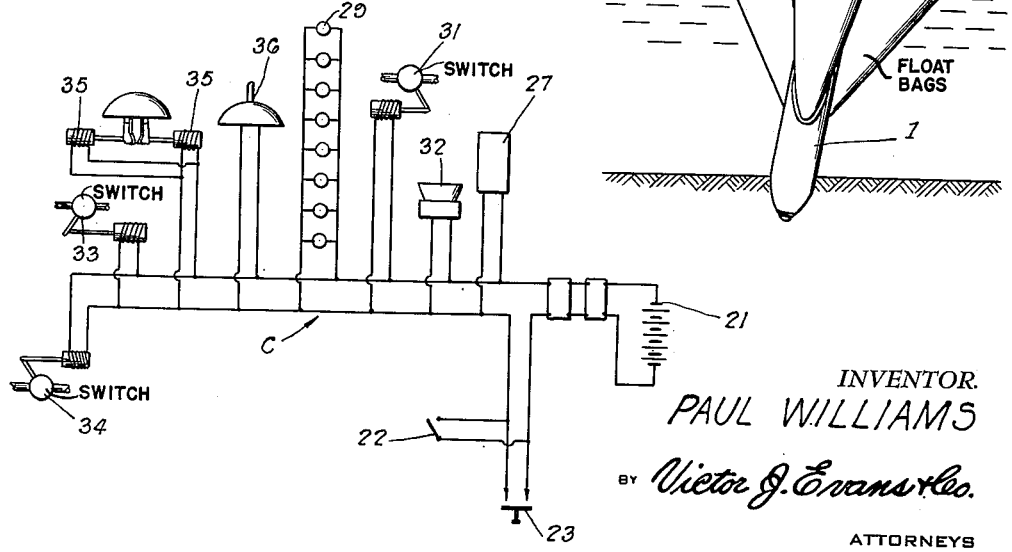
INVENTOR.
PAUL WILLIAMS
ATTORNEYS Patented Feb. 26, 1952

2,587,564

UNITED STATES PATENT OFFICE 2,587,564

AUTOMATIC DISTRESS SIGNALING DEVICE

Paul Williams, Burien, Wash.

Application June 7, 1947, Serial No. 753,194

7 Claims. (Cl. 177—329)

The present invention relates to the general class of marine and aeronautical signals, indicators, or markers, and more specifically to an improved automatic distress signalling device of the expendable type adapted to be carried as equipment by water borne craft and aircraft of various types, and means are provided for automatically launching or manually dropping the equipment from the carrying craft when necessary or desirable.

The primary object of the invention is the provision of a safety or distress signalling equipment that is provided with indicators for both daylight and night use which will be visible, and with audible signals including a radio sending set, as well as a horn for sounding comparatively short-distance distress signals; and electrical controls are provided which are operable manually, as well as automatically upon impact and after immersion in water for the activation of the various signals.

The signal device may be made in various sizes for heavy and light aviation or marine use, and dropped from ships as well as from land based or carrier based planes; and in addition to its use as a distress signal the equipment may be employed as a carrier for landing freight and other loads from a flying plane, aircraft, or ship.

The equipment of my invention may be automatically released from a ship at sea, or from an aircraft in flight in the event of a wreck, collision, or crash, of sufficient force to create greater impact than considered safe for emergency docking or landing, and the signalling device is forcibly ejected from a plane or ship away from the direction of travel of the plane or ship in order to assure safe landing of the equipment and proper functioning of its parts, outside of the possible crash zone of an aircraft, and also outside the probably fire zone of a ship at sea.

Means are provided, including expendable parts that are automatically released in the flight of the device, for floating the device to a safe landing and for preserving and protecting the various parts of the equipment from breakage and to insure proper operation, and performance of the required functions of the appliances at predetermined and proper times or periods.

Means are also provided in the mechanical construction of the device for reinforcing the interior of the device against strains and stresses occurring at impact, or landing of the device, and for protection of the different parts of the equipment carried within the device.

For the performance of these functions the invention consists in certain novel features of construction and combinations and arrangements of parts as will hereinafter be described and more specifically set forth in the appended claims.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claims, without departing from the principles of the invention.

Figure 2 is a vertical sectional view of the device, after the balloon-cap has been expended and the balloon inflated, and disclosing the helium float-bags after the protecting jacket for the bags has also been expended in the flight of the device.

Figure 3 is a view depicting the signal device after landing, and displaying the tethered balloon with its flashlight signals; and Figure 4 is a diagram of the electrical system of the device showing the electrically operated or controlled appliances in series with the main electric circuit.

Figure 1:
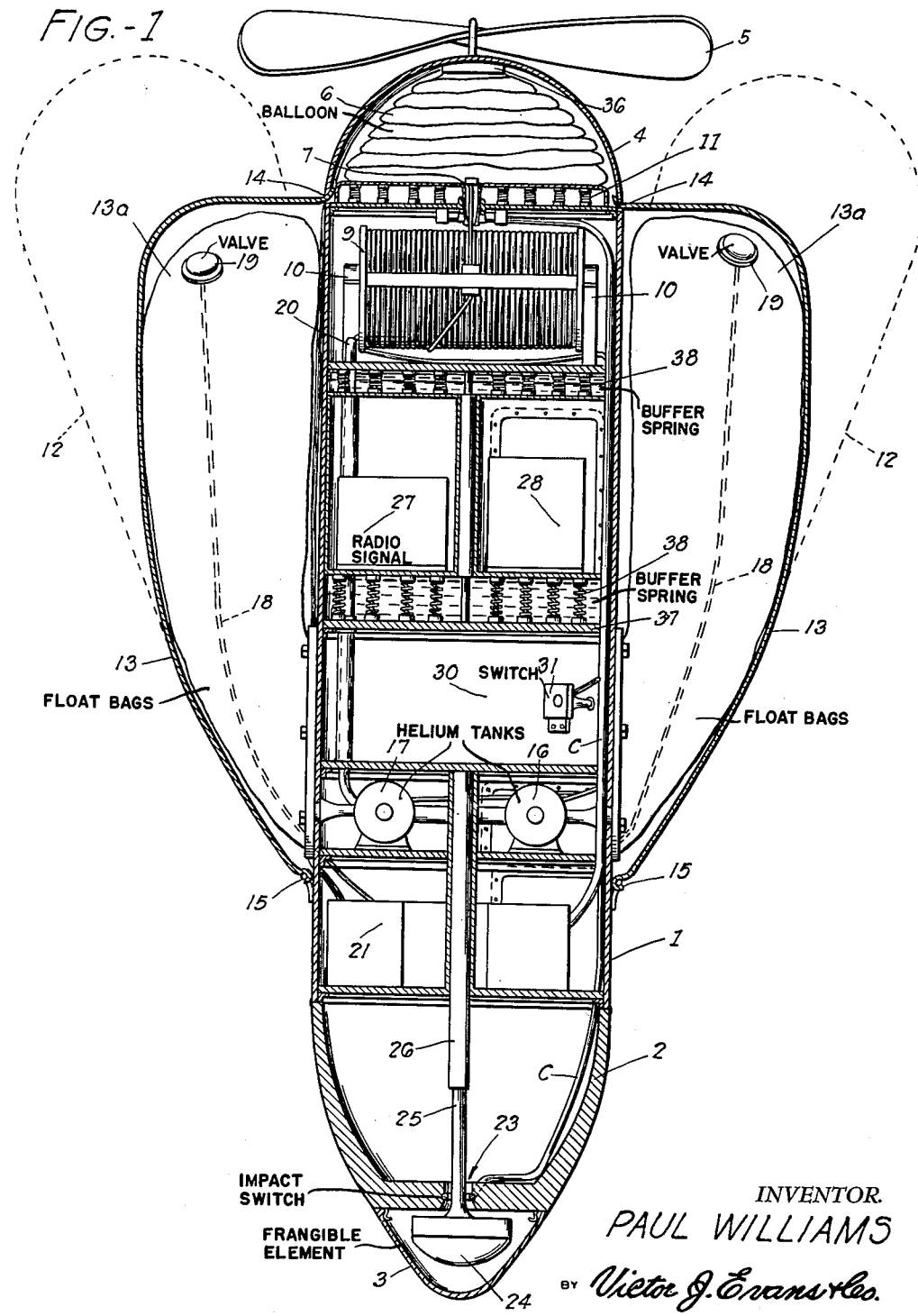
Figure 1 is a vertical sectional view of a signal device in which my invention is embodied, showing the interior equipment in full elevations, and indicating by dotted lines the equalizing or balancing vanes or wings that steer the device in its descent.

In the embodiment of the invention shown in the drawings I employ a cylindrical shell or casing 1, of light but strong material, the lower end of which terminates in a hollow head 2 that is equipped with a protective expendable and hollow nose 3 of frangible material that is shattered by impact, or by immersion of the nose, as the device strikes the ground or contacts with the water surface.

The upper closed end of the cylindrical shell is provided with an expendable or detachable cap 4 of hemispherical or dome-shape, which is equipped with an exterior rotor or spinner 5, which is revolved by co-action of air-currents with its vanes as the device descends, and electrically controlled, to detach the expendable cap, and thereby release a floating balloon 6 which suspends the device by means of cable 7.

The detachable expendable cap initially encloses the folded and packed balloon 6, and the tether or cable 7 of the balloon has one end attached thereto at 8 and its other end is wound upon a rotary drum 9 which is journaled in bearings 10 and located in an upper compartment of the shell 1.

The inner or lower end of the cap is supported on the upper end of the shell, and to assist in detaching and releasing the expendable cap, a series of ejector springs 11 are interposed between the cap and the upper end of the shell, and the compressed springs when released impart an initial movement to the cap, and assist in spreading the balloon folds for inflation.

For retaining the device in symmetrical upright position in its downward flight, a pair of laterally arranged steering and guiding vanes 12, 12, are utilized; and in addition, an exterior, expendable, jacket 13 is provided for enclosing and protecting two or more inflatable float bags 13a, 13a, that are to be inflated, by helium, after the jacket has been expended.

The jacket is detachably connected by automatically released hooks 14, and 15, to the shell; and the cap 4 is also operatively connected with the jacket, in order that these parts may fall clear and free of the signal device, to expose the balloon and float bags for inflation with helium.

The inflating gas is supplied to the float bags 13a and to the balloon 6 from expendable tanks or containers 16 and 17 located in a compartment of the cylindrical shell, and the supply through tubes 18 is controlled by valves 19, which, when the gas pressure in the tanks becomes too weak to hold the filling valves open, the valves automatically close, and release the tanks that fall away from the shell, reducing the weight of the device, and consequently preventing excessive descent of the device.

Helium is also supplied for inflating the balloon from the tanks 16, 17, through a supply tube 20, that extends up through the shell, and along the balloon cable, to the balloon 6.

For electrical control of the various operating appliances of the signal device, it is equipped with an initially open electrical system or control circuit C, receiving current from a battery of cells 21 stored within the interior of a battery compartment of the shell, and these appliances are connected in series with the control system or circuit C.

The electric circuit C may be manually closed by use of a main switch 22 in Fig. 4, and the control circuit C may be closed automatically by an impact switch 23, that includes a plunger bar or rod 25 that telescopes with a tubular guide 26 mounted within the cylindrical shell along its longitudinal axis.

Upon impact or immersion of the falling device, the frangible nose 3 is shattered to uncover the initially protected plunger head 24, and the latter by movement and impact closes switch 23. Also embodied in the head is a fluid pressure actuated immersion switch which is closed under water pressure; the immersion switch being set to operate at a predetermined depth under water, or the switch may be operated by continued immersion in water at a lesser depth.

The equipment includes a radio signal-sending set 27, and a signal control station 28 located within a compartment of the shell and connected in series with the circuit C; and branch wires are carried by cable 7 to perform the functions of an aerial to flashlight signals 29 mounted on the balloon and operative when it is inflated, as night signals. For a visible daylight signal a smoke-producing appliance 30 is enclosed within a compartment and controlled by an electric switch 31 of circuit C; and an audible signal or horn 32 is also connected in the circuit.

The helium valves 19 of the float-bags 13a and the balloon 6 are controlled respectively by switches 33 and 34, and the jacket 13 of the float-bags is automatically released by means of switches 35, 35; while the balloon is automatically released under control of switch 36. In its mechanical construction the device is equipped with a series of spaced and transversely arranged circular partitions 37 that provide interior reinforcement for the shell, and divide the shell into the required compartments to accommodate the various appliances.

For absorbing shocks and strains encountered by the device on impact, a series of buffer springs 38 are arranged between adjoining partitions, and if desired, hydraulic recoil appliances may also be utilized between adjoining partitions.

The drawings disclose the different stages and operations of the device in its descent after launching; as previously stated when a wreck, collision, or crash is inevitable the device embodying the invention is released from the ship at sea or from an aircraft in flight. When the air pressure strikes the rotor 5 it spins under the air pressure to remove the cap 4 and the jacket 13 for freeing the balloon and float-bags that are automatically inflated; it has already been stated that the ejector springs 11 will also assist the spinner in removing the cap 4. The inflation of the balloon and the float tank will be occasioned by the lowering of the gas pressure in the tanks 16 and 17 and since the balloon is not adapted to restrain the device in the air the same can be inflated after landing of the device. Should the floats not be inflated until after the device strikes the water the immersion thereof will immediately lower the pressure of the tank and cause the float-bags to inflate to support the device on the surface of the water and in Fig. 3 the device is shown at the moment of impact, with either land or water surface. Upon impact with land the switch 23 is actuated for the reason that the frangible nose 3 is shattered upon impact. If the device falls in the water an immersion switch will close the electrical circuit in the device to actuate the radio signalling set 27 and the signal control 28. Signals 29 on the balloon 6 will also be illuminated which by this time has been inflated and has risen to a height equal to the length of the cable 7. The smoke producing appliance 30 will also be actuated as will the audible signal 32. Should the valve 19 not operate soon enough through loss of pressure the switches 33, 34 and 35 will actuate to inflate the balloon and float-bags.

The balloon displays the electric flashlights for night signaling; the cable 7 with its radio aerial sends out signals from the radio set within the shell, and the float-bags 13a support the shell, buoyantly, in the water.

Thus a device has been perfected that will display signals for night or day and also send radio signals at either time.

Having thus fully described my invention, what I claim as new and desire to secure by Letters Patent is:

1. In an aerial distress signalling device adapted for launching from an aircraft in flight, the combination with a shell, of an expendable cap detachably mounted on the shell and a rotor mounted on the exterior of said cap and said rotor is operable under the pressure of air currents for removing the cap from the shell, an initially deflated balloon enclosed within the cap, means for inflating the balloon as it is pulled outwardly of the shell by the removal of the cap by the rotor and anchored to the shell, a plurality of electric signal lights carried by the balloon, said shell having an electric circuit including the lights, a control switch in the circuit, and means actuated by impact of the device for closing said switch.

2. In an aerial device adapted for launching from an aircraft in flight, the combination with a shell, of an expendable cap detachably mounted on the shell and a series of ejector springs compressed between the cap and shell, a rotor mounted on the exterior of said cap and said rotor is operable under the pressure of air currents for removing the cap from the shell, an initially deflated balloon within the cap and anchored to the shell, means for inflating the balloon as it is pulled outwardly of the shell by the removal of the cap by the rotor, a plurality of electric signal lights carried by the balloon and an electric circuit for the lights, a control switch in the circuit, and means actuated by impact of the device for closing said switch.

3. In an aerial device having a cylindrical shell, the combination with an initially deflated balloon and means for anchoring the balloon to the shell, means in the shell for inflating the balloon, an electric lighting circuit within the device and electric signal lights on the balloon, of a hollow head mounted on the device and a hollow frangible nose mounted on the head, an open control switch for the circuit located within the head, and a plunger device mounted in the head and nose actuated by impact for closing the switch.

4. In a distress signal buoy, the combination which comprises an elongated tubular casing having spaced transversely disposed dividing partitions therein providing a plurality of compartments in said casing, a fragile nose carried by the lower end of the casing, a plunger slidably mounted in the casing and having an impact head positioned in the said nose, a cap removably mounted on the upper end of the casing, a deflated balloon positioned in the cap, a balloon cable drum positioned in the upper part of the casing, a cable on said drum connected to the balloon, inflating means for inflating the balloon positioned in the casing, gas producing means positioned in an intermediate compartment of the casing, said means comprising means actuating the gas producing means by the impact head of the plunger.

5. In a distress signal buoy, the combination which comprises an elongated tubular casing having spaced transversely disposed dividing partitions therein providing a plurality of compartments in said casing, a fragile nose carried by the lower end of the casing, a plunger slidably mounted in the casing and having an impact head positioned in the said nose, a cap removably mounted on the upper end of the casing, a deflated balloon positioned in the cap, a balloon cable drum positioned in the upper part of the casing, a cable on said drum connected to the balloon and to inflating means therefor positioned in the casing, smoke producing means in an intermediate compartment of the casing, radio signal sending apparatus positioned in a second intermediate compartment of the casing between the upper part of the casing and said first intermediate compartment, and means actuating the radio signal sending apparatus, and smoke producing means by the impact head of the plunger.

6. In a distress signal buoy, the combination which comprises an elongated tubular casing having spaced transversely disposed dividing partitions therein providing a plurality of compartments in said casing, a fragile nose carried by the lower end of the casing, a plunger slidably mounted in the casing and having an impact head positioned in the said nose, a cap removably mounted on the upper end of the casing, a deflated balloon positioned in the cap, a balloon cable drum positioned in the upper part of the casing, a cable on said drum connected to the balloon, inflating means for the balloon positioned in the casing, smoke producing means in an intermediate compartment of the casing, lights carried by the balloon and casing, and means actuating the smoke producing means and lighting the light by the impact head of the plunger.

7. In a distress signal buoy, the combination which comprises an elongated tubular casing having spaced transversely disposed dividing partitions therein providing a plurality of compartments in said casing, a fragile nose carried by the lower end of the casing, a plunger slidably mounted in the casing and having an impact head positioned in the said nose, a cap removably mounted on the upper end of the casing, a deflated balloon positioned in the cap, a balloon cable drum positioned in the upper part of the casing, a cable on said drum connected to the balloon, inflating means for the balloon positioned in the casing, gas producing means positioned in an intermediate compartment of the casing, deflated float bags also carried by the casing, and means actuating the smoke producing means and also the gas producing means for inflating the balloon and float bags.

PAUL WILLIAMS.

REFERENCES CITED

The following references are of record in the file of this patent:

UNITED STATES PATENTS

| Number | Name | Date |
|---|---|---|
| 1,769,500 | Fisher | July 1, 1930 |
| 2,160,974 | Lueck | June 6, 1939 |
| 2,192,450 | Miller | Mar. 5, 1940 |
| 2,300,795 | McAllister | Nov. 3, 1942 |
| 2,342,363 | Oestnaes | Feb. 22, 1944 |
| 2,357,417 | Marple | Sept. 4, 1944 |
| 2,365,587 | Pennow | Dec. 19, 1944 |
| 2,367,330 | Dircksen et al. | May 22, 1945 |
| 2,380,587 | Fenton | July 31, 1945 |
| 2,474,537 | MacLeod | June 28, 1949 |